United States Patent
Tipton

(10) Patent No.: US 7,219,919 B2
(45) Date of Patent: May 22, 2007

(54) TRANSPORTABLE STORAGE CONTAINER

(76) Inventor: Dennis Tipton, 3948 Camino Real, Tallahassee, FL (US) 32311-3407

( * ) Notice: Subject to any disclaimer, the term of this patent is extended or adjusted under 35 U.S.C. 154(b) by 0 days.

(21) Appl. No.: 10/986,696

(22) Filed: Nov. 12, 2004

(65) Prior Publication Data

US 2006/0103116 A1    May 18, 2006

(51) Int. Cl.
*B62D 33/04* (2006.01)

(52) U.S. Cl. .............. 280/651; 280/652; 280/655.1; 280/656; 280/47.26

(58) Field of Classification Search ........... 280/651, 280/652, 655.1, 656, 47.26
See application file for complete search history.

(56) References Cited

U.S. PATENT DOCUMENTS

| | | | | |
|---|---|---|---|---|
| 2,445,275 A | * | 7/1948 | Lintern et al. .......... | 280/833 |
| 3,838,586 A | * | 10/1974 | Tennison .............. | 70/56 |
| 3,877,714 A | * | 4/1975 | Black ................ | 280/638 |
| 4,765,642 A | * | 8/1988 | Struzina .............. | 280/656 |
| 5,038,983 A | * | 8/1991 | Tomososki ............ | 224/521 |
| 5,310,209 A | * | 5/1994 | Holman .............. | 280/656 |
| 5,460,304 A | * | 10/1995 | Porter et al. .......... | 224/521 |
| 5,480,180 A | * | 1/1996 | Fuller et al. .......... | 280/656 |
| 5,725,037 A | * | 3/1998 | Faulhaber ............ | 144/285 |
| 5,984,342 A | * | 11/1999 | Ysker ................ | 280/492 |
| 6,634,701 B2 | * | 10/2003 | Votruba et al. ........ | 296/182.1 |

FOREIGN PATENT DOCUMENTS

| | | |
|---|---|---|
| EP | 0 068 436 A2 | 6/1982 |
| EP | 0 076 475 A2 | 9/1982 |
| WO | WO 94/18058 | 8/1994 |
| WO | WO 99/03719 | 1/1999 |
| WO | WO 02/08049 | 1/2002 |
| WO | WO 02/096760 A2 | 12/2002 |

OTHER PUBLICATIONS

Traction Coupler for Two-Wheeler (JP 1113912A2) http://www.delphion.com/details?pn=JP11139125A2.

* cited by examiner

*Primary Examiner*—J. Allen Shriver
*Assistant Examiner*—Cynthia F. Collado
(74) *Attorney, Agent, or Firm*—William H. Holliman

(57) ABSTRACT

A transportable storage container for securely storing construction tools that is readily moved around the job site by a single person and is readily towed behind a vehicle without the need to load and unload the storage container prior to and after transportation.

1 Claim, 3 Drawing Sheets

TRANSPORTABLE STORAGE CONTAINER

BACKGROUND OF THE INVENTION

1. Field of Invention

This invention generally relates to a transportable storage container. More particularly, the present invention allows a single person to easily store and transport tools and equipment and to easily move the storage container throughout a job-site.

2. Description of the Related Art

Most construction workers are intimately familiar with "gang boxes." Gang boxes are storage containers that, typically, are durable, secure, and heavy—particularly when loaded. Typically, each trade, or even foreman, at a construction project will have a gang box that is used to store tools, consumable materials, project drawings and plans, and other items that are required to be secured and safeguarded during the period that the gang box remains on the job-site while the gang box's owner is away from the job-site. For example, U.S. Pat. No. 3,838,586 to Tennison discloses an electrician's gang box that includes box structure which renders the box inaccessible to malefactors for the purpose of destroying the padlock.

However, a significant disadvantage of gang boxes like the one disclosed in the Tennison patent is that such boxes are heavy and difficult to transport. For example, a typical gang box is constructed of metal and is between 5 and 6 feet long, 3 feet wide and 3 to 4 feet tall. The gang box is then typically filled with tools and equipment that can easily weigh hundreds of pounds. To move a gang box from one job-site to another, or, to or from a construction company's office, requires the following process: 1) the gang box is unloaded of tools and equipment; 2) the box is physically lifted by three to four persons into the back of an appropriate vehicle; and 3) the tools and equipment are reloaded into the gang box. Upon arrival at the new destination, this process must be reversed. Obviously, this process is time and labor intensive.

Additionally, once on a jobsite, moving a typical gang box between locations at the jobsite, or to different floors of a building, involves a similar process of unloading the gang box, moving the gang box, and then reloading the gang box. Moreover, on many jobsites it is not possible to move gang boxes around the job site because typical gang boxes are too wide to fit through many standard door openings.

Given these inefficiencies, there is a need for a more efficient system that is of simple design and construction, that is inexpensive to manufacture, and that allows for the secure storage of tools and other valuables on the job site while providing a storage device that is easily transported, manageable by one person, and able to easily move to different locations on a job site.

BRIEF DESCRIPTION OF THE DRAWINGS

There are presently shown in the drawing embodiments of which are presently preferred, it being understood, however, that the invention is not so limited to the precise arrangements and instrumentalities shown, wherein.

The below table summarizes the reference numbers and associated elements shown in the above drawings:

| | |
|---|---|
| 100 | storage container |
| 101 | top |
| 102 | frame extension |
| 103 | front wall |
| 104 | side wall |
| 105 | rear wall |
| 106 | hinge |
| 107 | pin |
| 108 | coupler |
| 109 | bottom |
| 201 | suspension |
| 202A | first wheel well |
| 202B | second wheel well |
| 203 | lock pocket |
| 204A | first castor |
| 204B | second castor |
| 205 | castor leg |
| 206 | castor leg receiver |
| 207 | lock tab |
| 208 | wheel system |
| 209 | shackle |
| 210 | castor assembly |
| 300 | frame |
| 301A | first wheel |
| 301B | second wheel |
| 302A | first longitudinal member |
| 302B | second longitudinal member |
| 303 | second transverse member |
| 304 | first transverse member |
| 305 | axle |
| 306 | third longitudinal member |

DETAILED DESCRIPTION OF THE INVENTION

Figure 1:
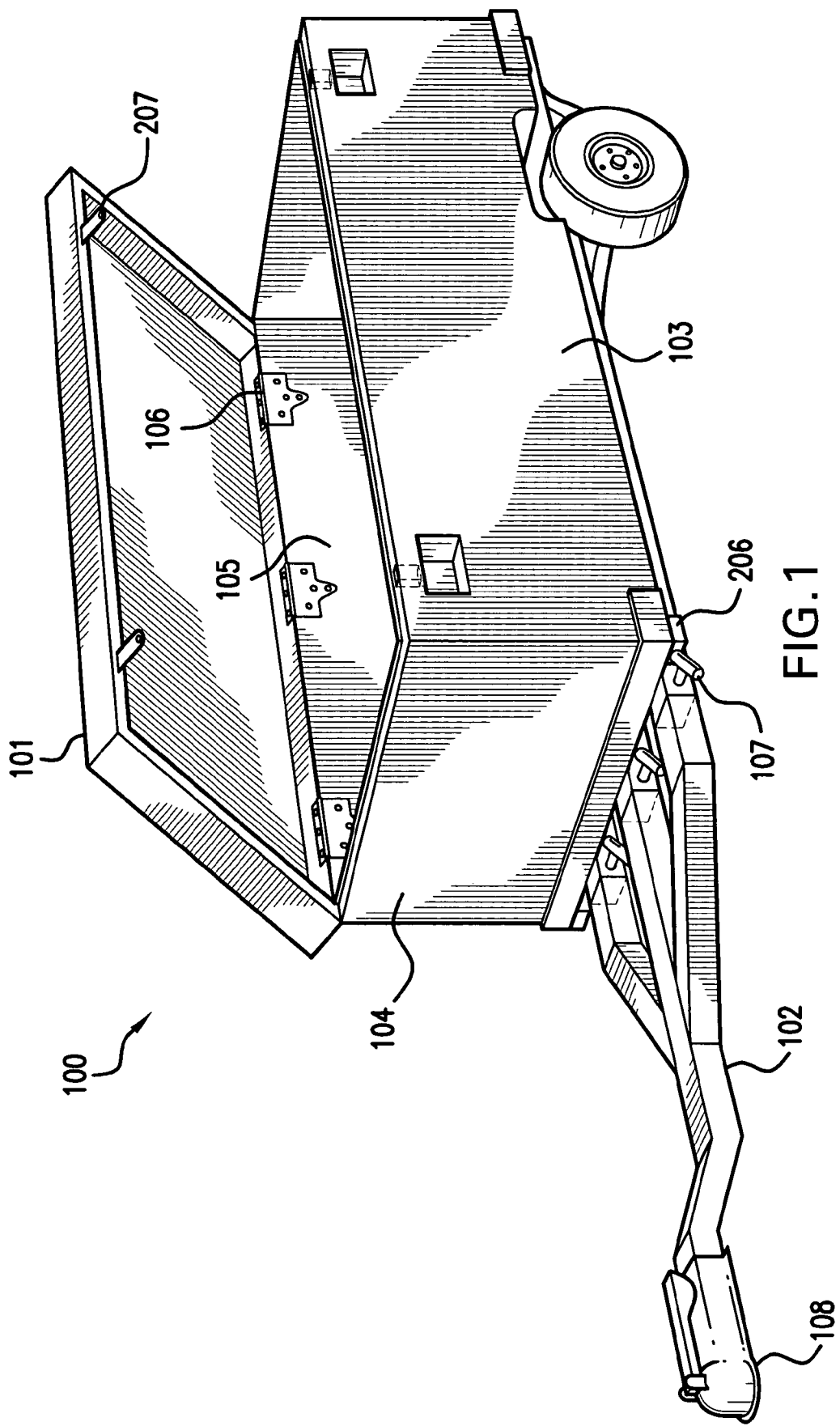
FIG. 1 is an isometric view of the transportable storage container of the present invention.

A first embodiment of a transportable storage container 100 is shown in a side perspective view in FIG. 1. The transportable storage container 100 includes a front wall 103, a rear wall 105, two side walls 104, and a top 101. It also includes a bottom 109 which is not shown in this view. Top 101 is shown in a partially open position and is hingedly connected to rear wall 105 via hinge 106. Hinge 106 may include any appropriate means for allowing top 101 to move from a closed position, where lock tabs 207 are inserted into lock pockets 203, to an open position, where full access to the interior of transportable storage container 100 is allowed. Such means may include a single strap or piano hinge, or multiple hinges as shown in FIG. 1. In the closed position, lock tabs 207 are engaged into lock pockets 203 such that a padlock, or other locking device (not shown), may secure top 101 to front wall 103 in such a manner that the locking device is protected from bolt cutters, thus enhancing the security of the transportable storage container 100.

Front wall 103, rear wall 105, side walls 104, top 101, and bottom 109 may be constructed of any durable, strong, sturdy, material. In one embodiment, these components are constructed of 10 gauge sheet metal. A sufficiently rigid and dense plastic material could also be used for these components.

Figure 3:
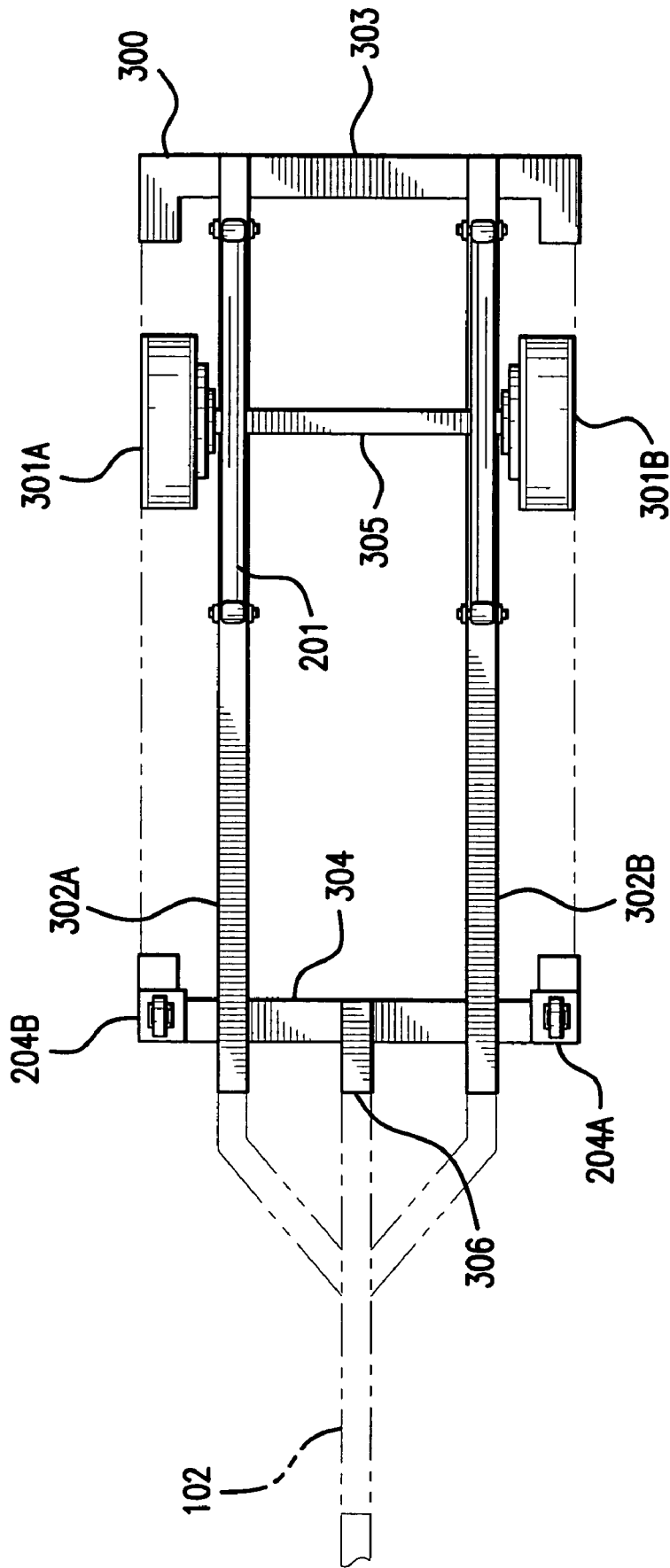
FIG. 3 is a bottom view of the transportable storage container of the present invention.

FIG. 3 is a bottom view of frame 300 that supports transportable storage container 100. In this embodiment, frame 300 is composed of two longitudinal members 302, a first transverse member 304, and a second transverse member 303. Longitudinal members 302 are connected to first transverse member 304 and second transverse member 303 by welding or by a mechanical connection such as screws, nails, nuts and bolts, or rivets. Transportable storage container 100 is attached to frame 300 by any suitable means such as welding, or by the use of mechanical connections such as screws, nails, nuts and bolts, or rivets. In the embodiment shown, transportable storage container 100 is welded to frame 300, and frame 300 is itself a welded assembly; also, longitudinal members 302 are constructed of tube steel and first transverse member 304 and second transverse member 303 are constructed of angle iron.

As used herein, the term "perimeter" refers to the outside edges of the area defined by the length and width of transportable storage container 100. Third longitudinal member 306 is connected to first transverse member 304 intermediate to the connections of longitudinal members 302 to first transverse member 304. Third longitudinal member 306 may also be constructed of tube steel. Frame 300 is constructed such that first longitudinal members 302A is disposed sufficiently inward along first transverse member 304 and second transverse member 303 that first wheel 301A is recessed within the perimeter created by portable storage container 100. Similarly, Frame 300 is constructed such that second longitudinal members 302B is disposed sufficiently inward along first transverse member 304 and second transverse member 303 that second wheel 301B is recessed within the perimeter created by portable storage container 100. First castor 204A and second castor 204B are similarly located within the perimeter created by portable storage container 100. Thus, the effective rolling width of transportable storage container 100 is defined by its perimeter as no components extend beyond the width of transportable storage container 100.

Figure 2:
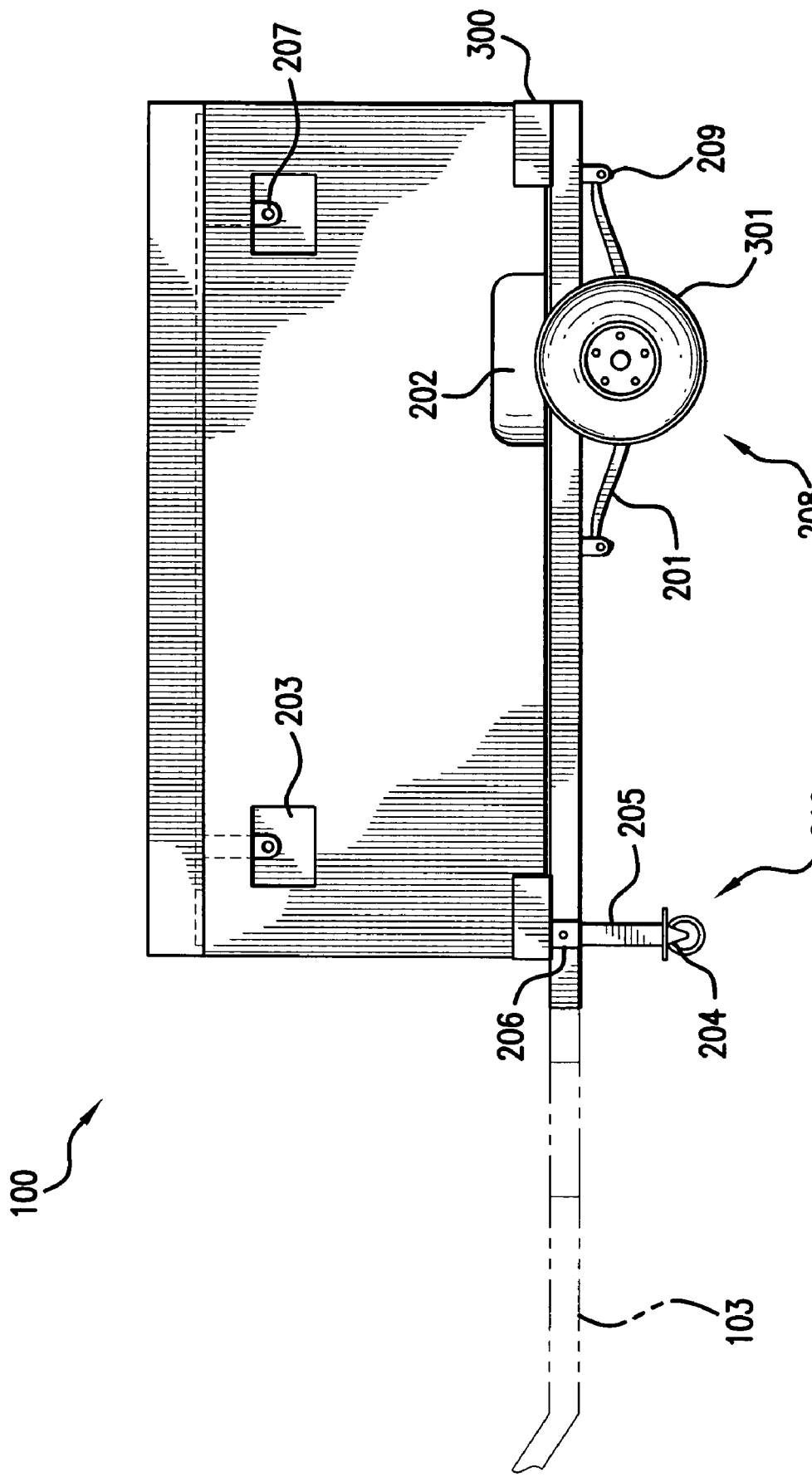
FIG. 2 is a side view of the transportable storage container of the present invention.

Referring to FIG. 2, wheel system 208 can be seen. Wheel system 208 is comprised of wheel 301 and suspension 201. In this embodiment, wheel 301 is a standard boat trailer wheel and suspension 201 is a single leaf spring. Shackles 209 are attached to frame 300. Suspension 201 is connected to shackles 209. As is known to those skilled in the art, alternative suspension systems may be employed such as coil spring systems. Alternatively, the suspension system may be omitted; however, omitting suspension 201 will result in decreased ride quality and shock absorption when transportable storage container 100 is being towed by a vehicle.

As shown in FIG. 3, first wheel 301A is connected to second wheel 301B by axle 305. In this embodiment, axle 305 is constructed of tube steel, but may also be constructed from any suitable structural material such as metal pipe, wood, or a composite material. Axle 305 is connected to suspension 201 at wheels 301A and 301B.

Referring back to FIG. 1, frame extension 102 can be seen connected to frame 300. In this embodiment, frame extension 102 is constructed of tube steel of a size that allows a slip fit connection between frame extension 102 and first longitudinal member 302A, second longitudinal member 302B, and third longitudinal member 306. These slip fit connections are secured by pins 107. Coupler 108 is attached to the outboard end of frame extension 102, and is adaptable to allow connection to any standard trailer hitch configuration.

Referring back to FIG. 2, castor assembly 210 can be seen. Castor assembly 210 is comprised of castor 204, castor leg 205, and castor leg receiver 206. In this embodiment, castor leg 205 is constructed of tube steel with a flat plate welded to the outboard end of castor leg 205. Castor leg 205 is adapted to allow mounting of castor 204 to the flat plate at its outboard end, and to provide a removable, slip fit connection with castor leg receiver 206 at its inboard end. As also can be seen in FIG. 2, castor assembly 210 is designed such that, once it is in place, transportable storage container 100 is level. In this embodiment, there are two castor assemblies 210.

As can be seen in FIG. 1 and FIG. 2, wheel system 208 fits within wheelwell 202. Wheelwell 202 is recessed into transportable storage container 100 and is sized to be at least as wide as wheel 301 and at least as tall as the amount of suspension travel provided by suspension 201.

In operation, transportable storage container 100 may be towed behind a truck or other suitable vehicle with a standard trailer hitch. Coupler 108 is adaptable to connect transportable storage container 100 to standard trailer hitch configurations. Once transportable storage container 100 has been towed to the desired destination, transportable storage container 100 is de-coupled from the tow vehicle, and two castor assemblies 210 are connected to transportable storage container 100. Frame extension 102 can then be disconnected from frame 300. At this point, transportable storage container 100 is easily rolled by a single person to the desired work location. Further, transportable storage container 100 is designed to be narrow enough to fit through standard door openings, and because wheel systems 203 and castor assemblies 210 do not increase the rolling width of transportable storage container 100, the width of transportable storage container 100 may be maximized, thereby increasing the available storage capacity, without sacrificing the ability to easily move transportable storage container 100 around a job site. Because wheel systems 208 do not have to be removed or installed to transition transportable storage container 100 from jobsite mode to transportation mode, the process of changing between these modes is greatly simplified.

While exemplary systems and methods embodying the present invention are shown by way of example, it should be understood that the invention is not limited to these embodiments. Modifications can be made by those skilled in the art, particularly in light of the foregoing teachings. For example, each of the elements of the aforementioned embodiments may be utilized alone or in combination with elements of other embodiments.

What is claimed is:
1. A transportable storage container comprising:
 a) a frame composed of:
  i) a plurality of longitudinal members, each of said longitudinal members having an inboard end and an outboard end; and
  ii) a first and second transverse member, said first transverse member being attached to said longitudinal members at said inboard end and said second transverse member being attached to said longitudinal members at said outboard end;
 b) a frame extension, adapted to be connected to said longitudinal members at said longitudinal members inboard ends, said frame extension further including means for connecting said frame extension to a tow vehicle;
 c) a storage container attachable to said frame, said storage container composed of:
  i) a bottom, a top, a front wall, a rear wall, and two side walls;
  ii) hinge means for securing said top to said storage container;
  iii) at least one lock pocket recessed into said storage container;

iv) a pair of wheel wells recessed into said storage container and located proximate to an outboard end of said storage container;
d) a pair of wheel systems, each of said wheel systems composed of:
   i) suspension means attachable to said frame;
   ii) a pair of wheels, each of said wheels attached to said suspension means and positioned such that said wheel does not extend outside of a perimeter defined by said bottom of said storage container, and each of said wheels is positioned under said wheel wells; and
   iii) an axle connecting said wheels
e) a pair of castor systems, each of said castor systems composed of:
   i) a castor leg receiver attached to said first transverse member;
   ii) a castor leg, said castor leg including a plate attached to an outboard end of said castor leg, said castor leg being removably attachable to said castor leg receiver;
   iii) a castor attachable to said plate wherein said castor systems are disposed proximate to an inboard end of said storage container and longitudinally aligned with said wheel systems.

* * * * *